US009256718B2

(12) United States Patent
Silin

(10) Patent No.: US 9,256,718 B2
(45) Date of Patent: Feb. 9, 2016

(54) SYSTEMS AND METHODS FOR LICENSING OF MOBILE APPLICATIONS

(71) Applicant: The Bauen Group, LLC., Houston, TX (US)

(72) Inventor: Walter Paul Silin, Houston, TX (US)

( * ) Notice: Subject to any disclaimer, the term of this patent is extended or adjusted under 35 U.S.C. 154(b) by 0 days.

(21) Appl. No.: 14/027,143

(22) Filed: Sep. 13, 2013

(65) Prior Publication Data

US 2015/0082454 A1 Mar. 19, 2015

(51) Int. Cl.

| | |
|---|---|
| ***H04L 29/06*** | (2006.01) |
| ***G06F 21/10*** | (2013.01) |
| ***G06F 21/31*** | (2013.01) |
| ***G06Q 99/00*** | (2006.01) |

(52) U.S. Cl.

CPC .............. *G06F 21/105* (2013.01); *G06F 21/10* (2013.01); *G06F 21/31* (2013.01); *G06Q 99/00* (2013.01)

(58) Field of Classification Search

CPC ..... G06F 21/10; G06F 1/6218; G06F 21/105; G06F 21/12; G06F 21/121; G06F 21/123; G06F 21/125; G06F 21/126; G06F 21/128; G06F 21/14; G06F 21/16; G11B 20/00086; G06Q 30/0202

See application file for complete search history.

(56) References Cited

U.S. PATENT DOCUMENTS

| | | | | |
|---|---|---|---|---|
| 2003/0032406 | A1 | 2/2003 | Minear et al. | |
| 2004/0004968 | A1 * | 1/2004 | Nassar | 370/401 |
| 2009/0150213 | A1 * | 6/2009 | Cyr et al. | 705/10 |
| 2012/0331527 | A1 * | 12/2012 | Walters et al. | 726/4 |
| 2013/0097315 | A1 | 4/2013 | Hao et al. | |
| 2013/0103804 | A1 | 4/2013 | Byrnes et al. | |
| 2013/0154800 | A1 * | 6/2013 | Holmes et al. | 340/10.1 |
| 2014/0250029 | A1 * | 9/2014 | Kato | 705/36 R |

* cited by examiner

*Primary Examiner* — Chau Le
*Assistant Examiner* — Ghodrat Jamshidi
(74) *Attorney, Agent, or Firm* — Fletcher Yoder P.C.

(57) ABSTRACT

System and methods for licensing of dynamic mobile applications are disclosed herein. In one embodiment, a non-transitory computer readable medium storing executable instructions is provided. The instructions, when executed by a processor, cause the processor to communicatively couple to a mobile device and to receive a user login, a user password, and a client identification from the mobile device. The instructions additionally cause the processor to validate a client as a licensed client based on the based on the user login, user password, and client identification and to derive a connectivity data based on the user login, user password, and client identification if the client is a valid licensed client, wherein the connectivity data comprises a first connectivity data configured to communicatively couple the mobile device to a first system; and wherein the mobile device is configured to download a first API from the first system.

20 Claims, 9 Drawing Sheets

SYSTEMS AND METHODS FOR LICENSING OF MOBILE APPLICATIONS

BACKGROUND

The subject matter disclosed herein relates to mobile application systems, and particularly to systems and methods for licensing mobile application processing.

Certain mobile devices, such as cell phones, tablets, and the like, may include or otherwise download applications suitable for executing certain processes. For example, mobile phones may execute applications useful in executing workflows associated with business process, such as enterprise resource planning (ERP) processes. The applications may be delivered, for example, via an app store, and downloaded to the mobile device. The mobile device may then execute the downloaded application to provide for desired functionality, e.g., the execution of the workflows. During continued business operations, the workflows and process may change. It would be beneficial to provide for improved systems and methods that incorporate changes to workflows and processes.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a non-transitory computer readable medium storing executable instructions is provided. The instructions, when executed by a processor, cause the processor to communicatively couple to a mobile device and to receive a user login, a user password, and a client identification from the mobile device. The instructions additionally cause the processor to validate a client as a licensed client based on the based on the user login, user password, and client identification and to derive a connectivity data based on the user login, user password, and client identification if the client is a valid licensed client, wherein the connectivity data comprises a first connectivity data configured to communicatively couple the mobile device to a first system; and wherein the mobile device is configured to download a first API from the first system.

In a second embodiment, a system is provided. The system includes a processor configured to communicatively couple to a mobile device and to receive a user login, a user password, and a client identification from the mobile device. The processor is additionally configured to validate a client as a licensed client based on the based on the user login, user password, and client identification. The processor is further configured to derive a connectivity data based on the user login, user password, and client identification if the client is a valid licensed client, wherein the connectivity data comprises a first connectivity data configured to communicatively couple the mobile device to a first system; and wherein the mobile device is configured to download a first API from the first system.

In a third embodiment, a method is provided. The method includes communicatively coupling a license server to a mobile device. The method additionally includes receiving, from the mobile device, a user login, a user password, and a client identification. The method further includes validating, via the license server, a client as a licensed client based on the based on the user login, user password, and client identification. The method also includes deriving, via the license server, a connectivity data based on the user login, user password, and client identification if the client is a valid licensed client, wherein the connectivity data comprises a first connectivity data configured to communicatively couple the mobile device to a first system; and wherein the mobile device is configured to download a first API from the first system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
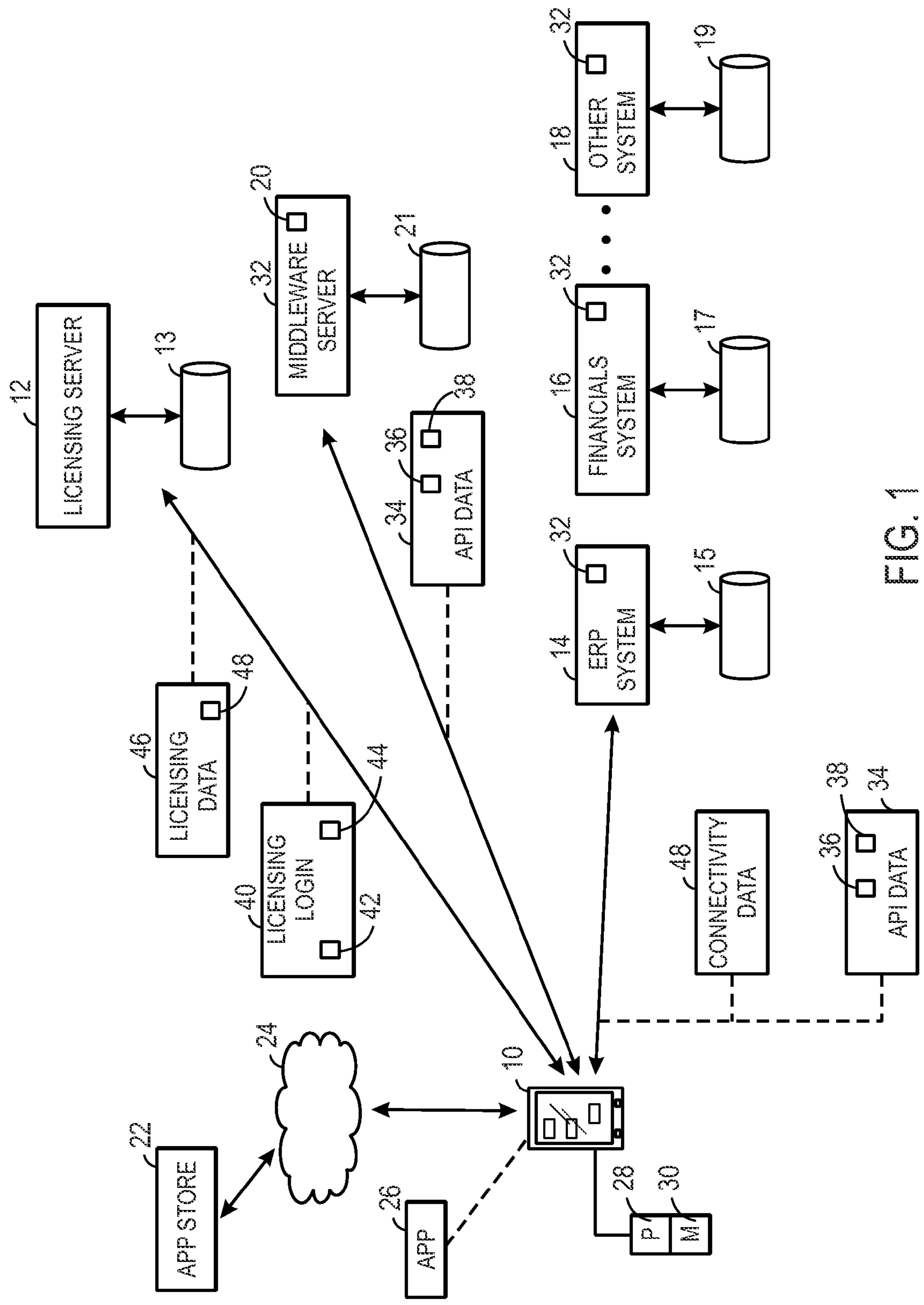
FIG. 1 is a block diagram illustrating an embodiment of a mobile device communicatively coupled to a license server, a customization system, and external systems.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may apply to a variety of mobile devices, cell phones, tablets, smart eyeglasses, watches, and the like. Certain embodiments may also apply to desktop computers, workstations, notebooks, laptops, and so on. The techniques described herein provide for improved systems and methods suitable for dynamically reconfiguring or otherwise reprogramming the graphical user interface (GUI) and the business processes, including workflows, of the aforementioned devices. In one embodiment, an application (app) store may host a mobile (or desktop) device application that includes certain reprogramming techniques. The application may be downloaded and executed by the mobile (or desktop) device, and communicatively connected to a license server. The license server may validate the user and/or mobile device and may then provide for communication information which may then enable the mobile device to communicatively couple with an external system, such as an enterprise resource planning system (ERP), a financial system, a supply chain management (SCM) system, a manufacturing system, or a combination thereof.

When the mobile is coupled to the external system, the mobile device may retrieve an application programming interface (API) suitable for reprogramming the look and feel of the mobile application's GUI, as well as reprogramming the processes included in the mobile application, including workflows. In certain embodiments, the entire API or portions of the API may be retrieved on every transaction between the mobile application and the external system, such as transactions that read data, transactions that write data (e.g., inserts of the data, updates of the data, and deletes of the data), or a combination thereof. In other embodiments, only certain transactions or transaction types may trigger the retrieval of the API or portions of the API, such as read transactions, insert transactions, update transactions, delete transactions, or a combination thereof. In yet another embodiment, certain time periods (e.g., 1 minute, 1 hour, 1 day, 1 week) may be used to trigger the download of the API or portions of the API into the application.

Additionally, a customization system may be provided, suitable for reconfiguring the API based on changes to certain processes. The customization system may enable an organization to customize the GUI presented by the application as well as the business processes executable by the application, and the customization may then be saved onto the API for transmission to the application. In certain embodiments, only the delta differences, e.g., the differences between the previous API and the changes to the latest API are transmitted to the application, thus minimizing communications and memory overhead. In other embodiments, all of the API may always be transmitted.

Turning now to FIG. 1, the figure is a block diagram of an embodiment of a mobile device 10, which may be communicatively coupled to a License Server 12, and an enterprise resource planning (ERP) system 14, a financial or accounting system 16, other external systems 18, and/or a middleware server 20. The mobile device 10 may include, for example, a cell phone, a tablet, smart eyewear, a smart wristwatch, or a combination thereof. In other embodiments, other computing devices, such as a computer, a work station, a notebook, a laptop, and so on, may be used additionally or alternatively to the mobile device 10. In the depicted embodiment, an application (app) store 22 is depicted. The app store 22 may include a variety of processor-executable programs or applications suitable for execution by the mobile device 10 or other computing device. As depicted, the app store 22 may be communicatively coupled to the mobile device 10 through a cloud system 24. The cloud 24 may include the internet, a local area network (LAN), a wide area network (WAN), or a combination thereof, suitable for establishing communication between the mobile device 10 and the app store 22. In use, the mobile device 10 may communicate with the app store 22 to download a dynamic application 26. The dynamic application 26 may include, executable code suitable for execution by via a processor 28 included in the mobile device 10, and may be stored in a non-transitory computer readable medium (e.g., flash memory, solid-state drive, hard drive) such as a memory 30 also included in the mobile device 10.

The dynamic application 26 may include certain processes useful in interfacing with the systems 14, 16, and/or 18. For example, unlike a web browser, the application 26 may include compiled client processes or programs suitable for communicatively coupling the mobile device 10 to the systems 14, 16, 18 and executing a variety of processes, such as human capital management (HCM) processes, supplier relationship management (SRM) processes, supply chain management (SCM) processes, financial and accounting processes, and a variety of services automation processes (e.g., project portfolio management, project analytics, program management, resource management, proposal management, project costing, project discovery, billing, contracts, expenses, grants). Also unlike a web browser, the application 26 may communicate directly with the systems 14, 16, 18 and/or 20 without going through a web browser, thus improving security and minimizing communications overhead. Indeed, the application 26 may include client-side support for executing, via the mobile device 10 and/or the systems 14, 16, and/or 18, a variety of processes useful in data processing. Each of the systems 12, 14, 16, 18 and 20 may include a respective data repository 13, 15, 17, 19 and 21, suitable for storing and retrieving data, such as a relational database, a network database, a cloud storage, a file system, or a combination thereof. The data repositories 13, 15, 17, 19, and/or 21 may also include security techniques, such as encrypted storage, suitable for protection of the data stored therein.

In use, the application 26 may display a graphical user interface (GUI) as described in more detail below representative of the processes, including workflows (processes abstracting a variety of sequential and/or non-sequential steps representative of 'real' work in an organization, such as purchasing steps, human resource steps, supply chain management steps, accounting steps, manufacturing steps, and so on) suitable for performing work supported by the systems 14, 16, and/or 18. For example, HCM processes may enable for improved human resources functionalities that increase productivity and accelerate business performance and lower costs of ownership. SRM processes may enable improved supply chain management and decreased supply management costs. SCM processes may provide for increased flexibility and synchronization of the supply chain, thus improving efficiencies and minimizing cost savings over the supply chain or portions of the chain. Services automation processes may provide for operational processes that support project life cycle management across operations, from initial financing to project selection, planning, staffing, through execution, cost control, and performance analysis. Accordingly, a user may perform any number of processes supported by the systems 14, 16, and/or 18 in devices distant from the location of the aforementioned systems. By providing for remote operations via the mobile device 10, the processes supported by the systems 14, 16, and/or 18, may be provided at any number of geographic locations more efficiently and in a more cost-effective manner.

In one embodiment, the application 26 may include executable code, such as compiled code (e.g. compiled C/C++, Java, C#, Objective C). For example, the application 26 may include code compiled to target a certain operating system such as an Android® operating system available from Google, Inc. of Mountain View, Calif., an iOS® operating system available from Apple Inc. of Cupertino, Calif., Windows® or Windows® derivative OS (e.g., Windows® Phone), and/or any other mobile device operating system. However, customizations to provide variations in processes between entities (e.g., company A, company B, company C) would have resulted in each company recompiling the code and submitting the updated compilation to the app store 22 as a different application 26. For example, company A may desire to provide customizations related to how processes supported by the systems 14, 16, and/or 18 are typically performed at company A, which may be different from processes provided by the systems 14, 16, and/or 18 but customized for company B and company C. Rather than provide for a plurality of different applications 26, each application 26 supporting a different company A, company B, company C, and so on, the techniques described herein allow for customization of the application 26 without resorting to recompilation of the application 26 and further uploading/downloading from the app store 22. Likewise, at least because of the compiled nature of the code, changes in the processes supported by the code would have resulted in a recompilation of the code, transmittal of the new version of the code to the app store 22, and subsequent downloads to the mobile device 10.

Instead of recompiling, each one of the systems 14, 16, and/or 18, may be provided with a customization system 32 suitable for customizing various aspects of the application 26. For example, the customization system 32 may enable the creation of an API Data 34 that includes a GUI sub-API 36 and/or a process sub-API 38 suitable for dynamically changing both the GUI of the application 26 as well as the behavior of the application 26 without further compilation of the dynamic application 26. Indeed, the API Data 34 may be transmitted to the mobile device 10 and used by the dynamic application 26 to reconfigure the look-and-feel of the application 26 as well as the behavior of the application 26 when interacting with the systems 14, 16, and/or 18. In this manner, a client, such as the company A, may provide for a custom API Data 34 different from an API Data 34 provided by a company B, and thus enable a customization for the company A of the GUI displayed by the dynamic application 26 as well as customization of the processes supported by the application 26. By providing for a customizable API data 34, the techniques described herein may more efficiently customize the GUI and/or functionality of the dynamic application 26. Further, licensing and customization systems are provided, useful in managing data for a variety of entities (e.g., companies A, B, C) as described in more detail below.

As depicted, the mobile device 10 may first communicate with the license server 12 by using a licensing login 40. The licensing login 40 may include, for example user login information 42 (e.g., username, password), as well as client login information 44 (e.g., company name) related to the various entities supported by the systems 14, 16, and/or 18, such as company A, company B, and so on. Once the licensing login 40 is received by the license server 12, the license server 12 may, for example, retrieve information from the data repository 13 and use the information to verify that the user interacting with the mobile device 10 has submitted appropriate licensing login information 40 suitable for providing further services. When the user interacting with the mobile device 10 has been verified through the submitted licensing login 40, the license server 12 may then transmit a licensing data 46 back to the mobile device 10. The licensing data 46 may include, for example, information suitable for further processing by the application 26, such as a connectivity data 48.

The connectivity data 48 may include information useful in communicatively coupling the mobile device 10 to any one or more of the systems 14, 16, 18. That is, the connectivity data 48 may include data useful in connecting the mobile devices to multiple systems, including the systems 14, 16, 18, and 20. For example, the connectivity data 48 may include Peoplesoft® connectivity information (e.g., one or more Peoplesoft® urls), Oracle® connection strings, MS Sharepoint® connection strings, MS SQLServer® connection strings, Open Database Connectivity (ODBC) connection strings, Java® Database Connectivity (JDBC) connection strings, service oriented architecture (SOA) services connectors, or a combination thereof.

Accordingly, the license server 12 may both verify the mobile device 10 as licensed to participate in certain processes, well as provide for the connectivity data 48 useful in connecting with any number of systems, including the systems 14, 16, 18, and/or 20. Once connected, each of the systems 14, 16, 18, and/or 20 may then transmit the API Data 34 to the mobile device 10. The dynamic application 26 may then reconfigure itself in situ and without further recompilation by using the API Data 34 to redraw the GUI and/or to reprogram the processes used in interacting with the systems 14, 16, 18, and/or 20.

The middleware server 20 may be included in any one of the systems 12, 14, 16, and/or 18, or may be used as a standalone server 20. For example, the middleware server 20 may be incorporated as a subsystem of the ERP system 14, and the server 20 may contain the functionality of the customization system 32 useful in modifying the API data 34, alternatively to the customization system 32 being included in the ERP system 14. Likewise, the middleware server 20 may be included in the systems 12, 16, and 18, or a combination thereof. Providing the middleware server 20 enables more efficient utilization of certain distributed server techniques, such as message oriented middleware (MOM) techniques, object request broker (ORB) techniques, and/or enterprise service bus (ESB) techniques useful in providing for enterprise services and/or an abstraction layer (e.g., customizable API abstraction layer) for any of the systems 12, 14, 16, and/or 18. It is to be understood that each of the server 12, and each of the systems 14, 16, 18, and 20 may each include a processor configured to execute any of the processes described herein, as well as a memory configured to store computer instructions (e.g., the executable processes).

Figure 2:
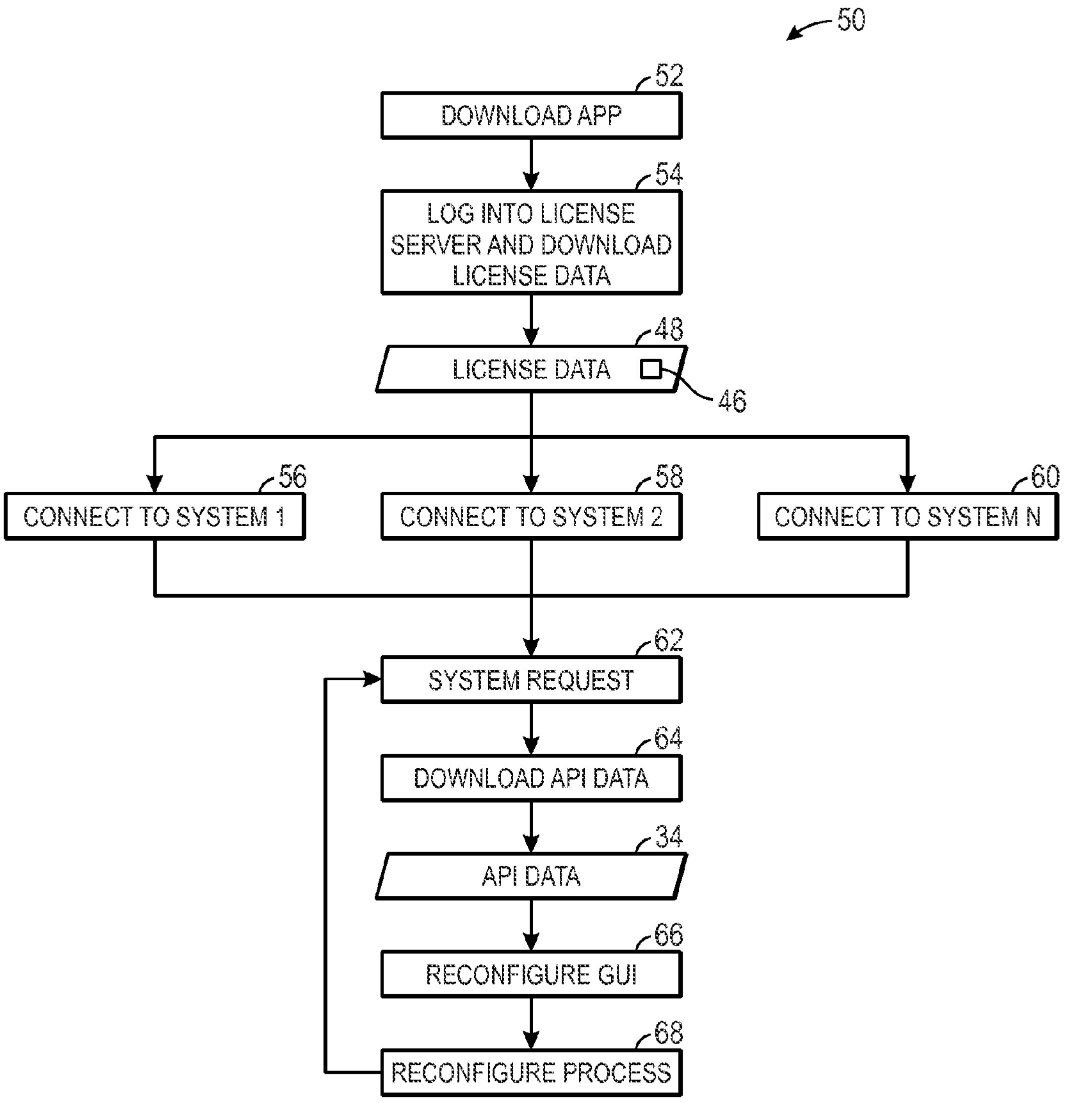
FIG. 2 is a flowchart illustrating an embodiment of a process suitable for reconfiguring or reprogramming the mobile device of FIG. 1.

Turning now to FIG. 2, the figure is a flowchart of an embodiment of a process 50 suitable for reconfiguring or otherwise reprogramming the dynamic application 26 of the mobile device 10 shown in FIG. 1 above in situ and without recompiling the application 26. The process 50 may be stored as computer instructions or executable code in the memory 30 of the mobile device 10 and executed by the processor 28.

In the depicted embodiment, the process 50 may download the application 26, for example, by utilizing the app store 22 (block 52). The process 50 may then provide the licensing login 40 and log in to the license server 12 to download the license data 40 (block 54). Accordingly, the license server 12 may validate the licensing login 46 by retrieving certain login and licensing data from the data repository 13, and then the licensing server 12 may provide the license data 40 to the mobile device 10. As mentioned above, the license data 40 may include connectivity data 48. Accordingly, the mobile device 10 may use the connectivity data 48 to communicatively couple to any one of the systems 14, 16, 18, and/or 20. For example, the mobile device 10 may connect (block 56) to a first system (e.g., ERP system 14), connect (block 58) to a second system (e.g., financials system 16), and additionally connect (block 60) to an Nth system (e.g., other system 18).

As mentioned above, the application 26 may then issue a system request 62, for example, a request 62 to read or write data or to perform a process action from any one of the systems 14, 16, 18, and/or 20. Upon receipt of the system request 62, any one of the connected systems 14, 16, 18, and/or 20 may then submit their respective API data 34 (block 64). That is, each one of the connected systems 1, 2, N, may have a customized API data 34 and therefore the application 26 may then receive one or more of the API data 34. Upon receipt of the API data 34, the application 26 may then reconfigure a respective GUI (block 66) for each one of the connected systems that may have provided the API data 34. Additionally or alternatively, each of the API data 34 may be used to reconfigure one or more processes (block 68) associated with the system that submitted the respective API data 34. By using the API data 34 to reconfigure the GUI and/or processes for connected systems, a highly customizable application 26 may be derived, suitable for supporting a number of clients (e.g., company A, B, C). The process 50 may then iterate and issue another system request 62. Indeed, in the depicted embodiment, every system request 62 (read or write of data, or process action) may result in the downloading (block 64) of the API data 34, and subsequent reconfiguration of the GUI (block 66) and desired processes (block 68). In this manner, the application 26 may always reflect the latest customization provided via the API data 34.

Figure 3:
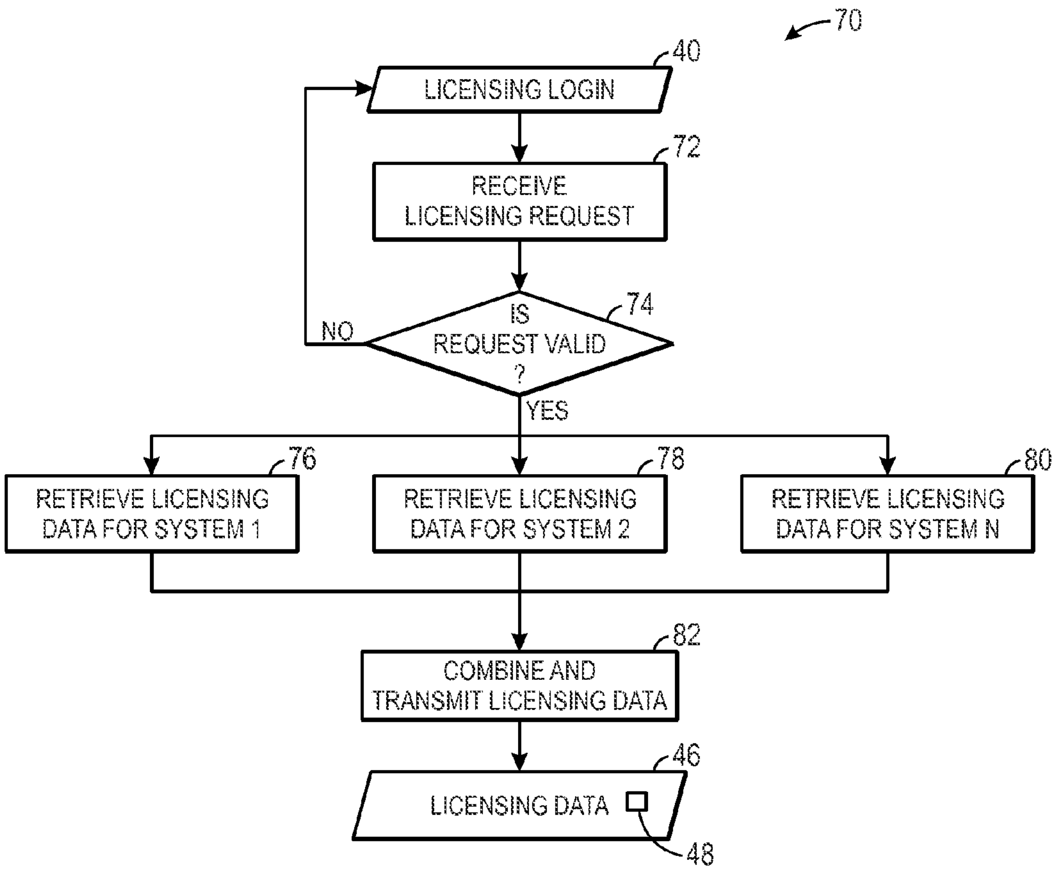
FIG. 3 is a flowchart illustrating an embodiment of a process suitable for validating clients via the licensing server of FIG. 1.

FIG. 3 is a flowchart of an embodiment of a process 70 suitable for processing the licensing login 40. The process 70 may be implemented as computer instructions or code executable by a processor of the license server 12 and stored in a non-transitory memory of the license server 12. As depicted, the process 70 may receive (block 72) the licensing login 40, for example, transmitted by the mobile device 10. The process 70 may then determine (decision 74) if the licensing login 40 is valid. In one embodiment, the process 70 may use the data repository 13 to compare, for example, usernames, passwords, and/or client names, to determine if a given client (e.g., company A) has a current license to use the license server 12, and if the username and password combination are stored in the repository 13. Licenses may be, for example, renewed weekly, monthly, quarterly, and/or yearly, upon payment of a license fee.

If the process 70 determines (decision 74) that the licensing request is not valid, the process 70 may inform the user for retransmission of the licensing login 40. If multiple attempts include incorrect licensing login 40, the process 70 may prevent any further login attempts and place the mobile device 10 in a holding queue for a desired period of time (e.g., 10 minutes, 1 hour, 2 hours, 1 day). When placed in the holding queue, any login requests from the mobile device 10 may be ignored. In other embodiments, no holding queue may be used and the any number of login attempts may be processed. If the process 70 determines (decision 74) that the licensing request (e.g., licensing login 40) is valid, the process 70 may then retrieve (block 76) licensing data for a first system (e.g., system 14), retrieve (block 78) licensing data for a second system (e.g., system 16), and retrieve (block 80) licensing data for an Nth system (e.g., system 18). Indeed, because each client (e.g., company A) may use multiple systems, the licensing server 12 may store multiple connectivity data 48, at least one for each of the systems 14, 16, 18, and/or 20 that the client may have installed. Accordingly, each of the connectivity data 48 (one or more for each system 14, 16, 18, and/or 20) may be combined (block 82) into a single licensing data message 46 and transmitted back to the mobile device 10. By validating the licensing login 40, retrieving and combining client-specific connectivity data 48, and transmitting the licensing data 48 back to the mobile device 10, the license server 12 may provide for an improved login process suitable for connecting the mobile device 10 to a variety of systems (e.g., systems 14, 16, 18, and/or 20).

Figure 4:
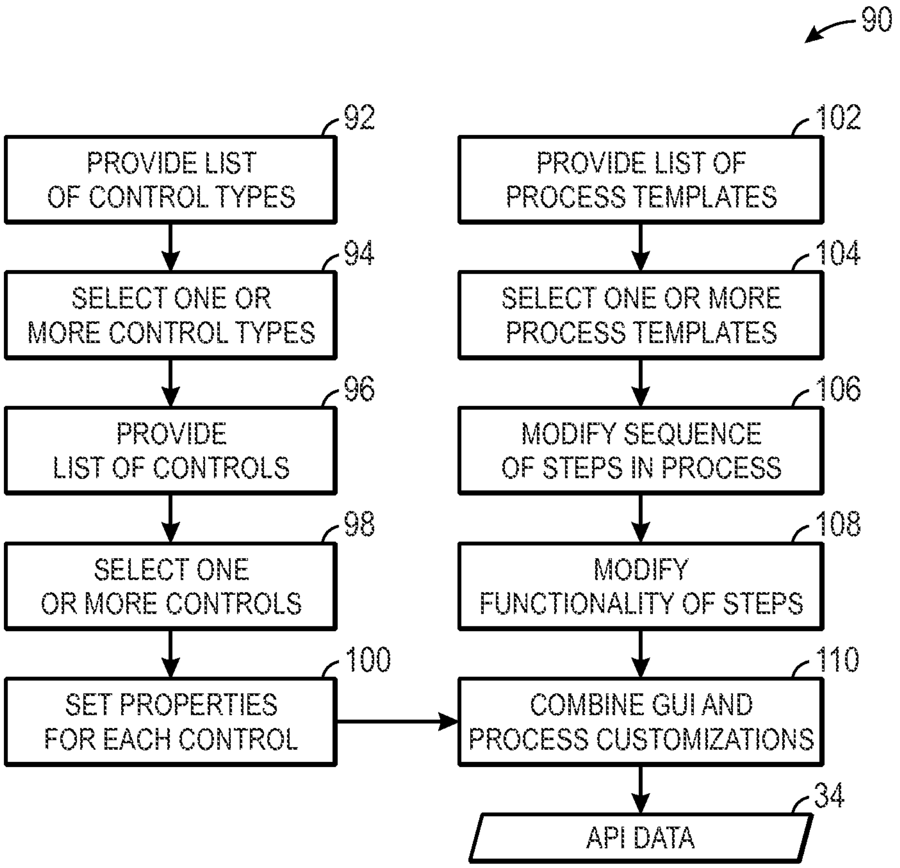
FIG. 4 is a flowchart showing an embodiment of a process suitable for customizing a GUI and/or a workflow.

FIG. 4 is a flowchart illustrating an embodiment of a process 90 suitable for deriving the API 34. The process 90 may be implemented as computer instructions or code executable by a processor of the customization system 32 and stored in a non-transitory memory of the customization system 32. In the depicted embodiment, the process 90 may customize the GUI for a given client by first providing for a list of GUI control types (block 92). The control types may include textboxes, labels, radio buttons, buttons, list boxes, dropdown menus, menus, tree views, up/down controls, and the like. The process 94 may then select one or more of the control types for customization (block 94). A list of the selected controls may then be provided (block 96). For example, the list may include GUI controls already in use by the GUI for a given client (e.g., client A) that is candidates for customization. The process 90 may then allow the selection (block 98) of one or more of the controls for display by the customized GUI. Each selected control may then be customized (block 100), for example, by applying desired property changes to the control. For example, the control's size (e.g., width and height), text, icon, position on a screen, display color, default value, and so on.

If customization of the process underlying the customized GUI is desired, a list of process templates may then be provided (block 102). The list may include processes that the GUI undergoing customization may interact with. Accordingly, these processes may also be selected (block 104) for customization. Templates may include workflows and/or processes related to HCM processes, SRM processes, SCM processes, financial and accounting processes, and a variety of services automation processes (e.g., project portfolio management, project analytics, program management, resource management, proposal management, project costing, project discovery, billing, contracts, expenses, grants). In one embodiment, the templates (and initial uncustomized GUI) may be provided by a manufacturer of the systems 14, 16, and/or 18, such as Oracle®, Microsoft®, SAP®, by the provider of the license server 12, or a combination thereof.

During customization, steps in the template may be reordered (block 106), for example, step 3 may be moved in front of step 2, or a step that was sequential may be converted into asynchronous, or vice versa. Likewise, the functionality of the step may be modified (block 108). For example, the step may execute a SQL query (insert, update, or delete query) and the SQL query may be modified to provide for a more customized result or action. The process 90 may then combine (block 110) the GUI customization and process customization into the API data 34. As mentioned above, in one embodiment, the API data 34 may be transmitted to the mobile device 10, for example, every time that the mobile device 10 interacts with the systems 14, 16, 18, and/or 20. Accordingly, changes to the API data 34, for example, by using the process 90, may be more easily and efficiently distributed.

The API 34 may be provided in various formats, including tokenized strings, binary formats, XML, text-based formats, and the like. One non-limiting API 34 example using XML as a format is as follows:

A Request for an API 34 may take the following form:

```
<apps>
  <authtoken>161d23s5df45w6e546s5d4f65e1sd654fe5</authtoken>
</apps>
```

Where the authtoken is a process (e.g., process template) identifier that may include subidentifiers. A Response (e.g., data in the API 34) may be as follows:

```
<MwAppList>
  <authtoken>161d23s5df45w6e546s5d4f65e1sd654fe5</authtoken>
  <MwAppListRow>
    <businessprocess>SAC_APPROVALS</businessprocess>
    <count>3</count>
    <descr>Approvals</descr>
    <descrlong>This Business Process controls how requisition
  approvals, denials and recycles are handled.</descrlong>
  </MwAppListRow>
  <MwAppListRow>
    <businessprocess>PO_APPROVALS</businessprocess>
    <count>1</count>
    <descr>Approvals</descr>
    <descrlong>This Business Process controls how requisition
  approvals, denials and recycles are handled.</descrlong>
  </MwAppListRow>
  <MwAppListRow>
    <businessprocess>ASSET_APPROVALS</businessprocess>
    <count>20</count>
    <descr>Approvals</descr>
    <descrlong>This Business Process controls how requisition
  approvals, denials and recycles are handled.</descrlong>
  </MwAppListRow>
</MwAppList>
```

Where businessprocess is the template process the response is focused towards, descr may be a short description of the template process, descrlong may be a long description of the template process, and each MwAppListRow relates to row details of certain data associated with the template process. A List of Workflow Items may be provided as follows:

Request for the List of Workflow Items

```
<req.list>
  <authtoken>161d23s5df45w6e546s5d4f65e1sd654fe5</authtoken>
  <businessprocess>SAC_APPROVALS</businessprocess>
</req.list>
```

Response Data (e.g., List of Workflow Items) may be as follows:

```
<MwHeaderList>
  <authtoken>161d23s5df45w6e546s5d4f65e1sd654fe5<authtoken>
  <MwFieldDefinitions>
    <MwFieldDefn1 descr="BUSINESS_UNIT" descrlong="" key=""
  length="5" lookup="" required="" type="">Business Unit
  </MwFieldDefn1>
    <MwFieldDefn2 descr="REQ_ID" descrlong="" key="" length="10"
  lookup="" required="" type="">Requisition ID</MwFieldDefn2>
    <MwFieldDefn3 descr="REQ_STATUS" descrlong="" key=""
  length="4" lookup="" required="" type="">Requisition
  Status</MwFieldDefn3>
    <MwFieldDefn4 descr="HOLD_STATUS" descrlong="" key=""
  length="1" lookup="" required="" type="">Hold From Further
  Processing</MwFieldDefn4>
    <MwFieldDefn5 descr="REQ_DT" descrlong="" key="" length="10"
  lookup="" required="" type="">Requisition Date</MwFieldDefn5>
  </MwFieldDefinitions>
  <MwHeaderRow>
    <Z0>!US001!0000000196</Z0>
    <LineApprovals>1</LineApprovals>
    <LineValue1>US001</LineValue1>
    <LineValue2>0000000196</LineValue2>
    <LineValue3>P</LineValue3>
```

-continued

```
    <LineValue4>N</LineValue4>
    <LineValue5>2013-08-30</LineValue5>
  </MwHeaderRow>
</MwHeaderList>
```

Line Details for a Transaction may be provided with the following request:

```
<detail>
  <authtoken>161d23s5df45w6e546s5d4f65e1sd654fe5</authtoken>
  <businessprocess>SAC_APPROVALS</businessprocess>
  <z0>!US001!0000000188</z0>
</detail>
```

The response to the Line Details for a Transaction request may include the following:

```
<?xml version="1.0"?>
<MwLineList>
  <authtoken>161d23s5df45w6e546s5d4f65e1sd654fe5<authtoken>
  <MwFieldDefinitions>
    <MwFieldDefn1 descr="BUSINESS_UNIT" descrlong="" key=""
    length="5" lookup="" required="" type="">Business
    Unit</MwFieldDefn1>
    <MwFieldDefn2 descr="REQ_ID" descrlong="" key="" length="10"
    lookup="" required="" type="">Requisition ID</MwFieldDefn2>
    <MwFieldDefn3 descr="LINE_NBR" descrlong="" key="" length="5"
    lookup="" required="" type="">Line Number</MwFieldDefn3>
    <MwFieldDefn4 descr="REQ_DT" descrlong="" key="" length="10"
    lookup="" required="" type="">Requisition Date</MwFieldDefn4>
    <MwFieldDefn5 descr="REQUESTOR_ID" descrlong="" key=""
    length="30" lookup="" required=""
    type="">Requester<MwFieldDefn5>
    <MwFieldDefn6 descr="ENTERED_DT" descrlong="" key=""
    length="10" lookup="" required="" type="">Entered
    on</MwFieldDefn6>
    <MwFieldDefn7 descr="STATUS_DESCR" descrlong="" key=""
    length="30" lookup="" required="" type="">Status
    Description</MwFieldDefn7>
    <MwFieldDefn8 descr="VENDOR_NAME1" descrlong="" key=""
    length="40" lookup="" required="" type=""/>
  </MwFieldDefinitions>
  <MwLineRow>
    <ParentKey>!US001!0000000188</ParentKey>
    <businessprocess>SAC_APPROVALS</businessprocess>
    <Z0>!US001!0000000188!1</Z0>
    <LineValue1>US001</LineValue1>
    <LineValue2>0000000188</LineValue2>
    <LineValue3>1<LineValue3>
    <LineValue4>2013-07-23</LineValue4>
    <LineValue5>RAY<LineValue5>
    <LineValue6>2013-07-23</LineValue6>
    <LineValue7>Pending Approval</LineValue7>
    <LineValue8/>
  </MwLineRow>
</MwLineList>
```

Distribution details for a transaction may be provided with the following request:

```
<distrib>
  <authtoken>161d23s5df45w6e546s5d4f65e1sd654fe5<authtoken>
  <businessprocess>SAC_APPROVALS</businessprocess>
  <z0>!US001!0000000188!1</z0>
</distrib>
```

A response to the request for distribution details may include the following:

```
<?xml version="1.0"?>
<MwLineList>
  <authtoken>161d23s5df45w6e546s5d4f65e1sd654fe5<authtoken>
  <MwFieldDefinitions>
    <MwFieldDefn1 descr="BUSINESS_UNIT" descrlong="" key=""
    length="5" lookup="" required="" type="">Business
    Unit</MwFieldDefn1>
    <MwFieldDefn2 descr="LINE_NBR" descrlong="" key="" length="5"
    lookup="" required="" type="">Line Number</MwFieldDefn2>
    <MwFieldDefn3 descr="REQ_ID" descrlong="" key="" length="10"
    lookup="" required="" type="">Requisition ID</MwFieldDefn3>
  <MwFieldDefinitions>
  <MwLineRow>
    <ParentKey>!US001!0000000188!1</ParentKey>
    <Z0>!US001!0000000188!1!1!1</Z0>
    <LineValue1>US001</LineValue1>
    <LineValue2>1<LineValue2>
    <LineValue3>0000000188</LineValue3>
  </MwLineRow>
<MwLineList>
```

An action request for a transaction may include the following:

```
<action>
  <authtoken>161d23s5df45w6e546s5d4f65e1sd654fe5</authtoken>
  <businessprocess>SAC_APPROVALS</businessprocess>
  <z0>!US001!0000000188</z0>
  <actiontodo>Approve</actiontodo>
  <comment>Comment to user</comment>
</action>
```

A response to the action request may provide the following:

```
<MwActionList>
  <authtoken>161d23s5df45w6e546s5d4f65e1sd654fe5<authtoken>
  <z0>!US001!0000000188<z0>
  <success>True</success>
  <message>Approval complete.</message>
<MwActionList>
```

Figure 5:
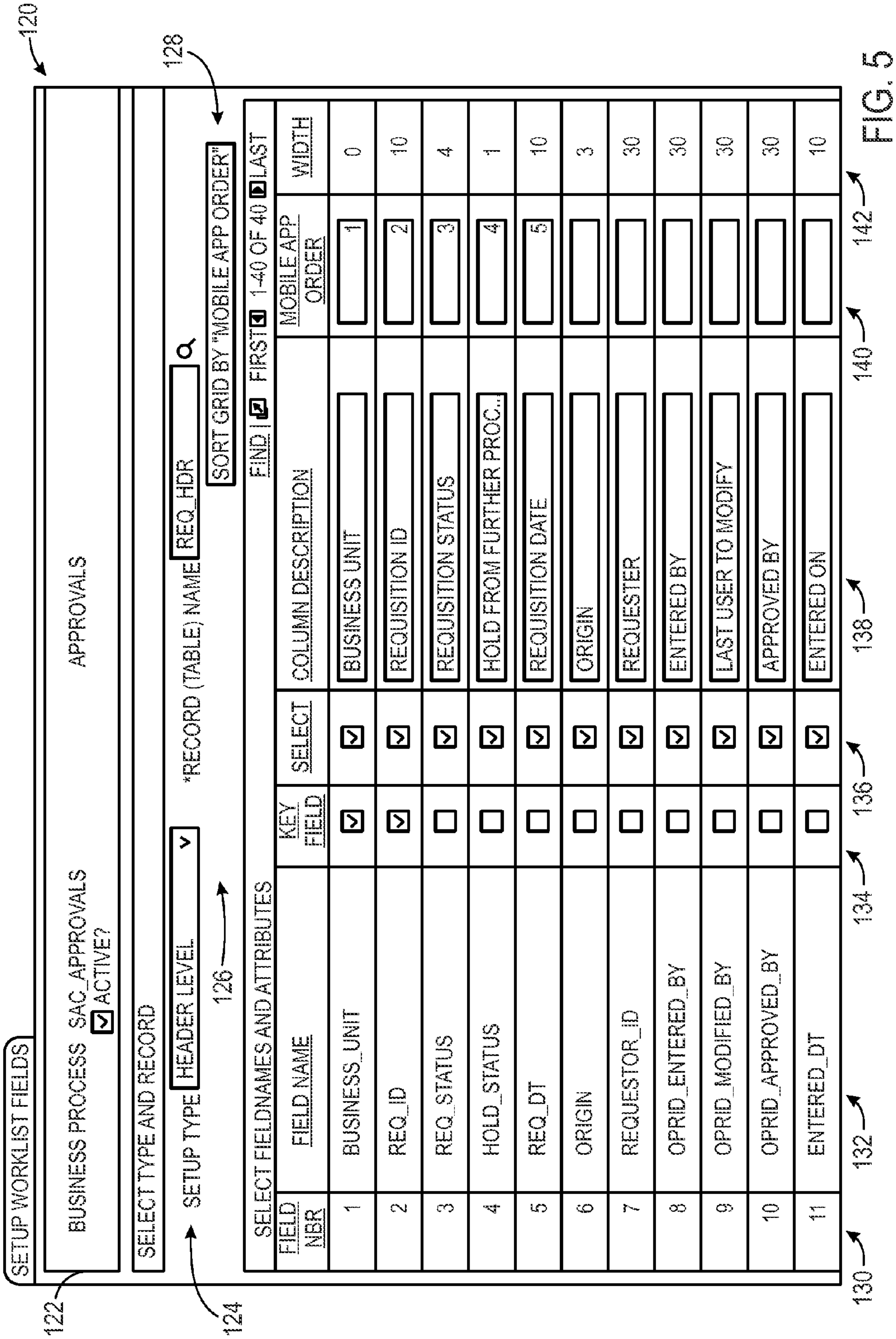
FIG. 5 depicts a first screen embodiment of a customization of an approvals process.
Figure 6:
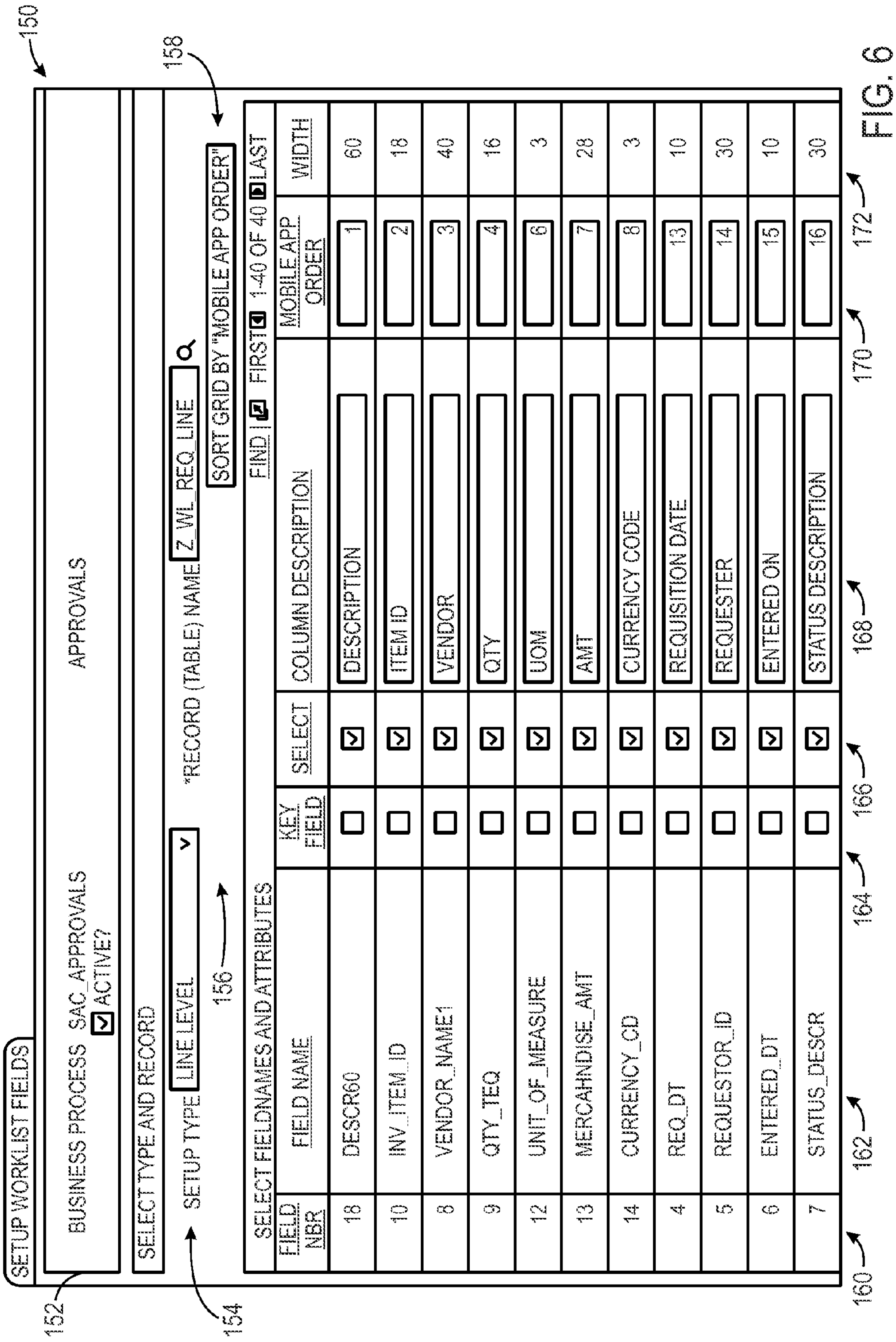
FIG. 6 depicts a second screen embodiment of a customization of the approvals process.
Figure 7:
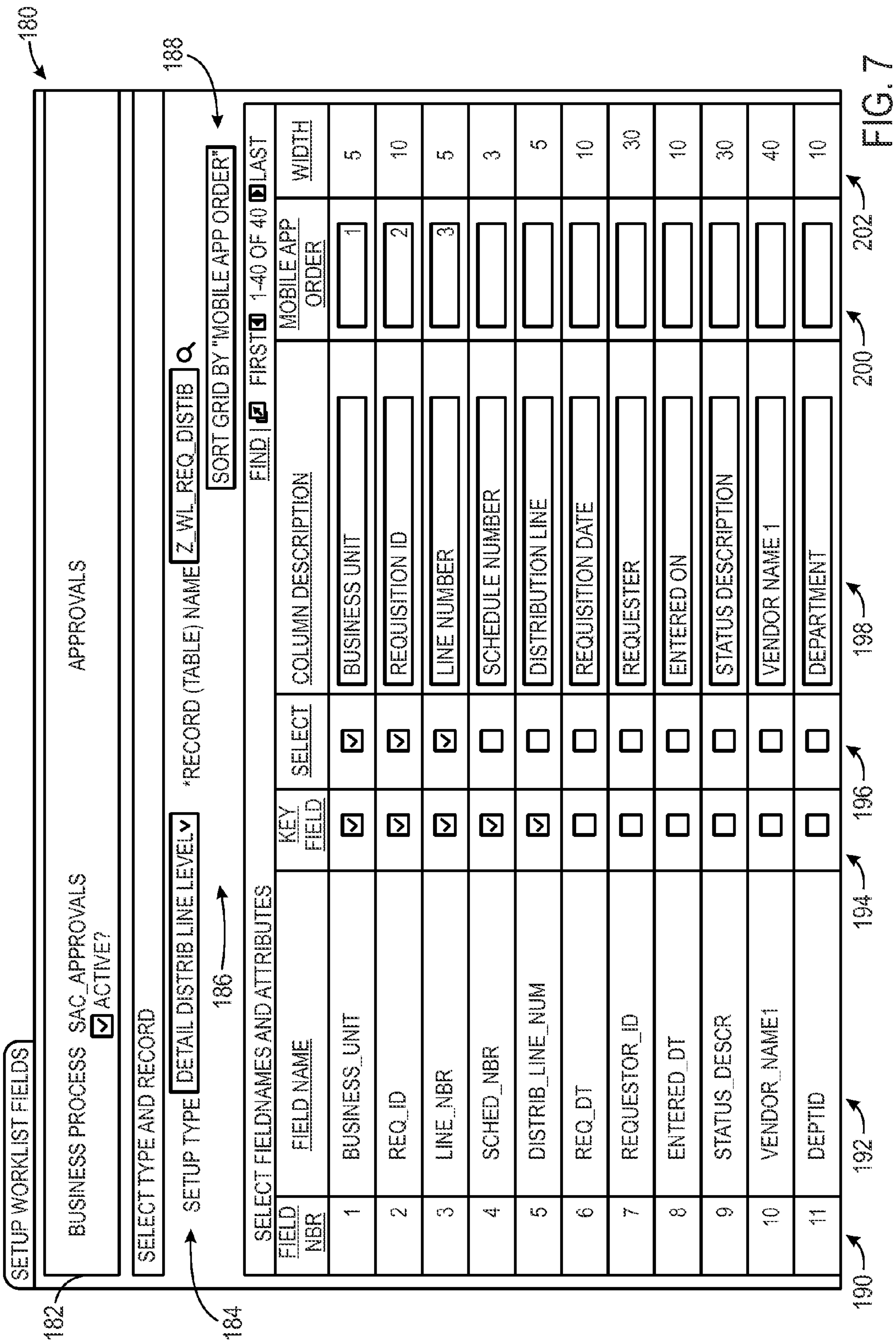
FIG. 7 depicts a third screen embodiment of a customization of the approvals process.

FIGS. 5, 6, and 7 are embodiments of various screens that may be used to customize the GUI and/or process supported by the dynamic application 26. Turning now to FIG. 5, the figure illustrates an embodiment of a screen or display 120 suitable for customizing the API data 34. For example, the display 120 may be provided by executing computer instructions stored in a memory of the customization system 32 and executed by a processor of the customization system 32. In the depicted embodiment, the screen includes a section 122 suitable for informing a user of the workflow or process template that is undergoing customization via the display 120 (e.g., "approval" workflow). The display 120 includes a drop down control 124 that enables the selection of various sections of the aforementioned workflow (e.g., "header level" section). Any number of sections may be provided. In this particular workflow (e.g., "approval" workflow), the sections include a hierarchy having a header section at the top, a line section below, and a detail distributed line level section below the line section. That is, a single header may have multiple lines, and each line may have multiple detail distributed line data.

In the depicted embodiment, the display 120 further includes a record or table name text box 126 that may be used to retrieve data useful in populating the columns 130, 32, 134, 136, 138, 140, and 142. In one embodiment, by typing data into the text box 126 (e.g., text string "REQ_HDR"), the screen 120 may execute a query suitable for retrieving data for the columns 130, 32, 134, 136, 138, 140, and 142. In one embodiment, the query may include a SQL view, such as a view that may include certain relational algebra (e.g., conditional query) conditions abstracting one or more tables into single virtual table. The query may retrieve data from the repositories 15, 17, 19, and/or 21 and then populate the columns 130, 32, 134, 136, 138, 140, and 142. Other query types may be used, including parameterized queries, object-based queries, and so on. Activating a control button 128 may then sort the queried data in the same order that will be shown when displayed in the application 26.

Column 130 may be representative of a field number, while column 132 may be representative of a name for the field. Column 134 may provide for checkmarks denoting which fields may be used as unique keys. That is, the fields checked on column 134, in combination, may provide for a unique key useful in identifying a row of data in the SQL view. Column 136 may be used to select whether or not the particular field is presented by the GUI of the application 26. That is, fields selected via a checkmark may be presented by the GUI and manipulated by the application 26. Unselected fields may not be presented, and thus, may not be seen or used by a user interacting with the application 26.

Column 138 may be used to provide a customizable text used to display the particular field in the GUI. The user may enter any desired text and the GUI may then display the typed text when displaying data associated with the field. Column 140 may provide for an ordering of the presentation of the respective fields of data. For example, an order of 1 may present the field first, 2 may present the field second, and so on. Accordingly, the client may customize the order of the fields presented by the GUI. Column 142 may be representative of a width for the text boxes when displayed on the GUI. Accordingly, the client may enter a desired width and the text box may be reshaped by the GUI to the desired width.

FIG. 6 illustrates an embodiment of a screen or display 150 suitable for further customizing the API data 34 based on line levels associated with header customization of FIG. 5. The display 150 may be provided by executing computer instructions stored in a memory of the customization system 32 and executed by a processor of the customization system 32. In the depicted embodiment, the screen includes a section 152 suitable for informing a user of the workflow or process template that is undergoing customization via the display 150 (e.g., "approval" workflow). The display 150 includes a drop down control 154 that enables the selection of various sections of the aforementioned workflow (e.g., "line level" section associated with a header of FIG. 5).

In the depicted embodiment, the display 150 further includes a record or table name text box 156 that may be used to retrieve data useful in populating the columns 160, 162, 164, 166, 168, 170, and 172. In one embodiment, by typing data into the text box 156 (e.g., text string "Z_WL_REQ_LINE"), the screen 150 may execute a query suitable for retrieving data for the columns 160, 162, 164, 166, 168, 170, and 172. In one embodiment, the query may include a SQL view, such as a view that may include certain relational algebra (e.g., conditional query) conditions abstracting one or more tables into single virtual table. The query may retrieve data from the repositories 15, 17, 19, and/or 21 and then populate the columns 160, 162, 164, 166, 168, 170, and 172. Other query types may be used, including parameterized queries, object-based queries, and so on. Activating a control button 158 may then sort the queried data in the same order that will be shown when displayed in the application 26.

Column 160 may be representative of a field number, while column 162 may be representative of a name for the field. Column 164 may provide for checkmarks denoting which fields may be used as unique keys. That is, the fields checked on column 164, in combination, may provide for a unique key useful in identifying a row of data in the SQL view. Column 166 may be used to select whether or not the particular field is presented by the GUI of the application 26. That is, fields selected via a checkmark may be presented by the GUI and manipulated by the application 26. Unselected fields may not be presented, and thus, may not be seen or used by a user interacting with the application 26.

Column 168 may be used to provide a customizable text used to display the particular field in the GUI at a line level. The user may enter any desired text and the GUI may then display the typed text when displaying data associated with the field. Column 170 may provide for an ordering of the presentation of the respective fields of data. For example, an order of 1 may present the field first, 2 may present the field second, and so on. Accordingly, the client may customize the order of the fields presented by the GUI. Column 172 may be representative of a width for the text boxes when displayed on the GUI. Accordingly, the client may enter a desired width and the text box may be reshaped by the GUI to the desired width.

FIG. 7 illustrates an embodiment of a screen or display 180 suitable for further customizing the API data 34 based on detailed line levels associated with line customization of FIG. 6. The display 180 may be provided by executing computer instructions stored in a memory of the customization system 32 and executed by a processor of the customization system 32. In the depicted embodiment, the screen includes a section 182 suitable for informing a user of the workflow or process template that is undergoing customization via the display 180 (e.g., "approval" workflow). The display 180 includes a drop down control 184 that enables the selection of various sections of the aforementioned workflow (e.g., "detail distrib line level" section associated with a line of FIG. 6).

In the depicted embodiment, the display 180 further includes a record or table name text box 186 that may be used to retrieve data useful in populating the columns 190, 192, 194, 196, 198, 200, 202. In one embodiment, by typing data into the text box 156 (e.g., text string "Z_WL_REQ_DISTIB"), the screen 180 may execute a query suitable for retrieving data for the columns 190, 192, 194, 196, 198, 200, 202. In one embodiment, the query may include a SQL view, such as a view that may include certain relational algebra (e.g., conditional query) conditions abstracting one or more tables into single virtual table. The query may retrieve data from the repositories 15, 17, 19, and/or 21 and then populate the columns 190, 192, 194, 196, 198, 200, 202. Other query types may be used, including parameterized queries, object-based queries, and so on. Activating a control button 188 may then sort the queried data in the same order that will be shown when displayed in the application 26.

Column 190 may be representative of a field number, while column 192 may be representative of a name for the field. Column 194 may provide for checkmarks denoting which fields may be used as unique keys. That is, the fields checked on column 194, in combination, may provide for a unique key useful in identifying a row of data in the SQL view. Column 196 may be used to select whether or not the particular field is presented by the GUI of the application 26. That is, fields selected via a checkmark may be presented by the GUI and manipulated by the application 26. Unselected fields may not be presented, and thus, may not be seen or used by a user interacting with the application 26.

Column 198 may be used to provide a customizable text used to display the particular field in the GUI at a line level. The user may enter any desired text and the GUI may then display the typed text when displaying data associated with the field. Column 200 may provide for an ordering of the presentation of the respective fields of data. For example, an order of 1 may present the field first, 2 may present the field second, and so on. Accordingly, the client may customize the order of the fields presented by the GUI. Column 202 may be representative of a width for the text boxes when displayed on the GUI. Accordingly, the client may enter a desired width and the text box may be reshaped by the GUI to the desired width. In one embodiment, the displays 120, 150, and 180 may be provided by the same executable code. That is, the display 120 may be converted into the display 150 by selecting the "line level" option via the dropdown 124. Likewise, the display 150 may be converted into the display 180 by selecting the "detail distrib line level" option via the dropdown 154. By providing for the displays 120, 150, and 180, the techniques described herein may provide for a customization of a variety of processes and workflows, for example, supported by the systems 14, 16, 18, and/or 20.

Figure 8:
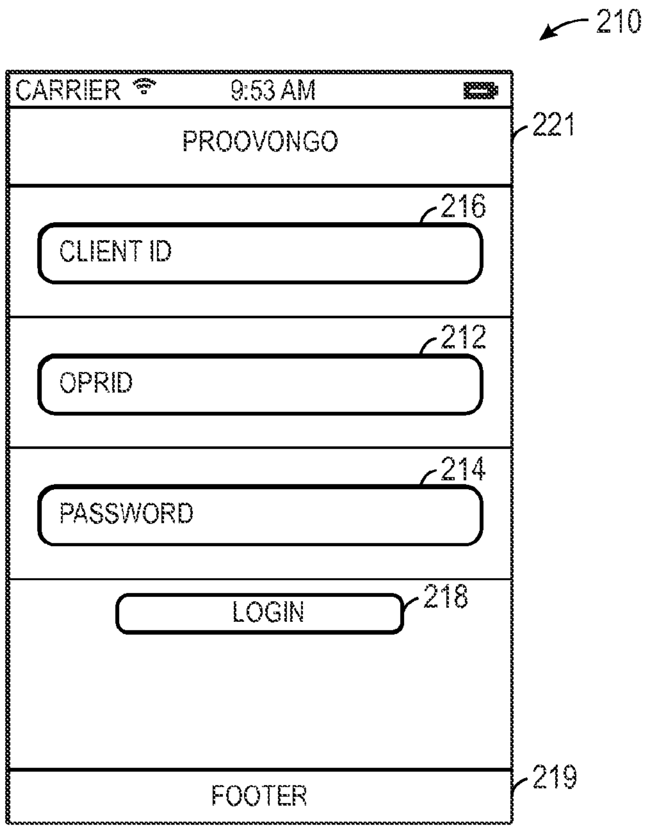
FIG. 8 illustrates an embodiment of a login screen for the mobile device of FIG. 1.

FIG. 8 illustrates an embodiment of a login screen 210 displayed via the mobile device 10. The screen 210 may be provided as code stored in the memory 30 and executed by the processor 28. In the depicted embodiment, the user may input a username via a text box 212 and a user password via a text box 214. The user may also input a client id via a text box 216. The user may then activate a button 218, thus transmitting the login information 40 to the license sever 12. As mentioned above, the license server 12 may then verify that the client inputted via the text box 216 is licensed to use the application 26, and may additionally verify the username/password combination. Upon verification, the license server 12 may then transmit licensing data 46, including connectivity data 48, back to the mobile device 10, and the mobile device 10 may use the connectivity data 48 to connect to one or more of the systems 14, 16, 18, and/or 20. Once connected, the mobile device 10 may download API data 34 and use the API data 34 to reconfigure the application 26.

Figure 9:
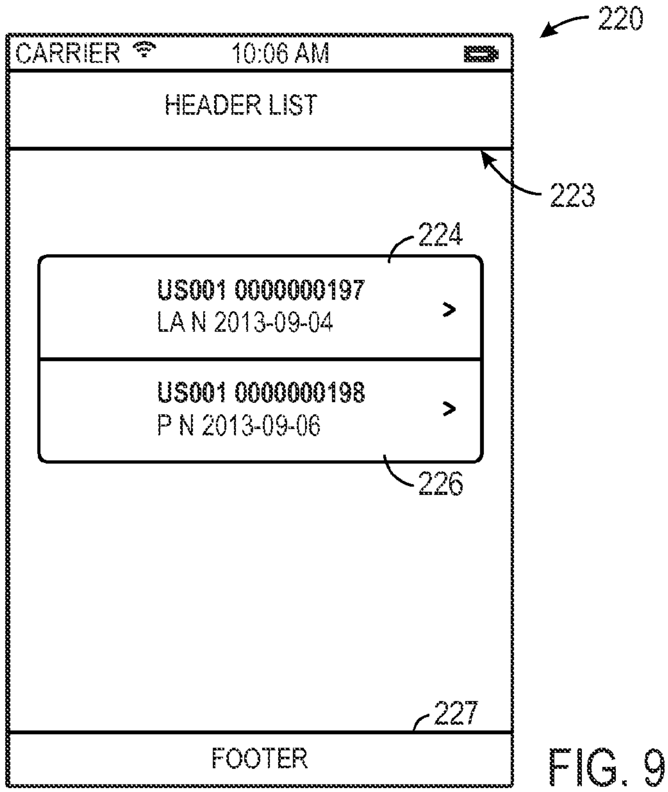
FIG. 9 illustrates an embodiment of a selection screen for the mobile device of FIG. 1.
Figure 10:
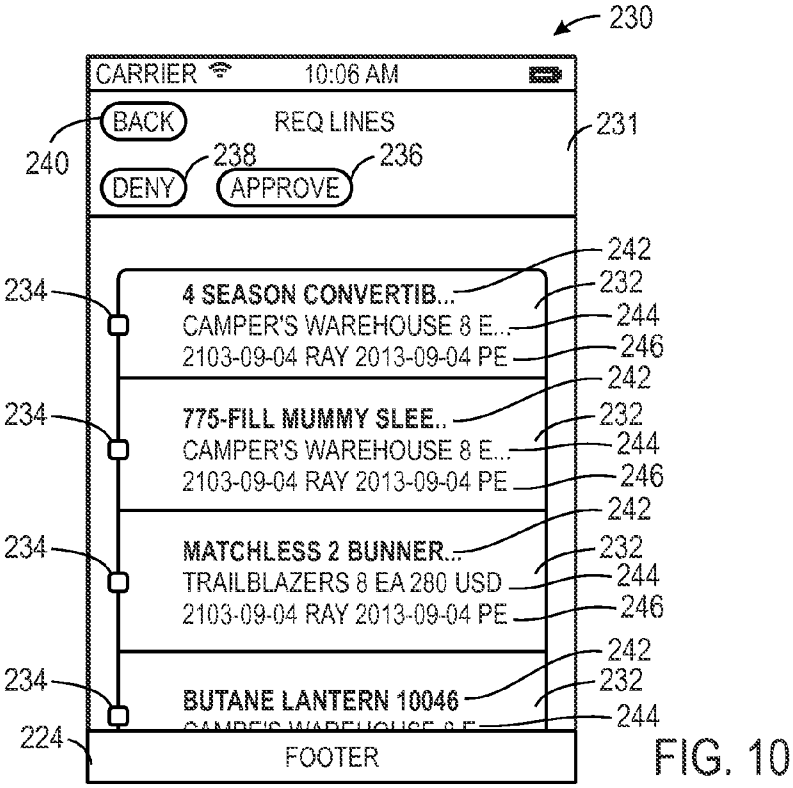
FIG. 10 illustrates an embodiment of a workflow screen for the mobile device of FIG. 1.

For example, FIG. 9 illustrates an embodiment of a selection screen 220 that may be displayed by the mobile device 10 once the mobile device 10 has connected to any one or more of the systems 14, 16, 18, and/or 20 and downloaded the API data 34. The screen 220 may be provided as code stored in the memory 30 and executed by the processor 28. The API data 34 may then instruct the application 26 to display a header section 223 and a footer section 227 having desired textual and/or graphical items, such as the text "header list" and "footer," respectively. The application 26 may also display a list of headers 224, 226, based on the data associated with an approval process. The user may select one of the headers 224, 226 and the application 26 may then display a workflow screen, as depicted in FIG. 10. More specifically, FIG. 10 depicts and embodiment of a workflow screen 230 suitable for approving various items. The screen 230 may be provided as code stored in the memory 30 and executed by the processor 28. The screen 230 may include a section 231 useful in presenting various controls, as described in more detail below, to approve or deny certain items during, for example, a purchasing workflow.

In the depicted embodiment, the application 26 may retrieve a plurality of line items 232 based on the header 224 or 226 selected in FIG. 9 above. Each line item 232 may include a respective checkbox 234. Accordingly, the user may select one or more of the checkboxes 234, and then activate the button 236 to approve the item(s) or the button 238 to deny the item(s). To navigate back to the screen 220, a back button 240 may be activated. As mentioned above, the dynamic application 226 may reconfigure presentation, accordingly, each of the textual items 242, 244, and 246 may have been selected to be displayed by the screen 230, and additionally may have been customized to be displayed in the depicted order. Indeed, by providing for the customization system 32 suitable for customizing processes and workflows via the API 34 and the dynamic application 26, the techniques described herein may provide for the client (e.g., company A) a more organization-centric mobile application, thus improving workflow efficiency.

Figure 11:
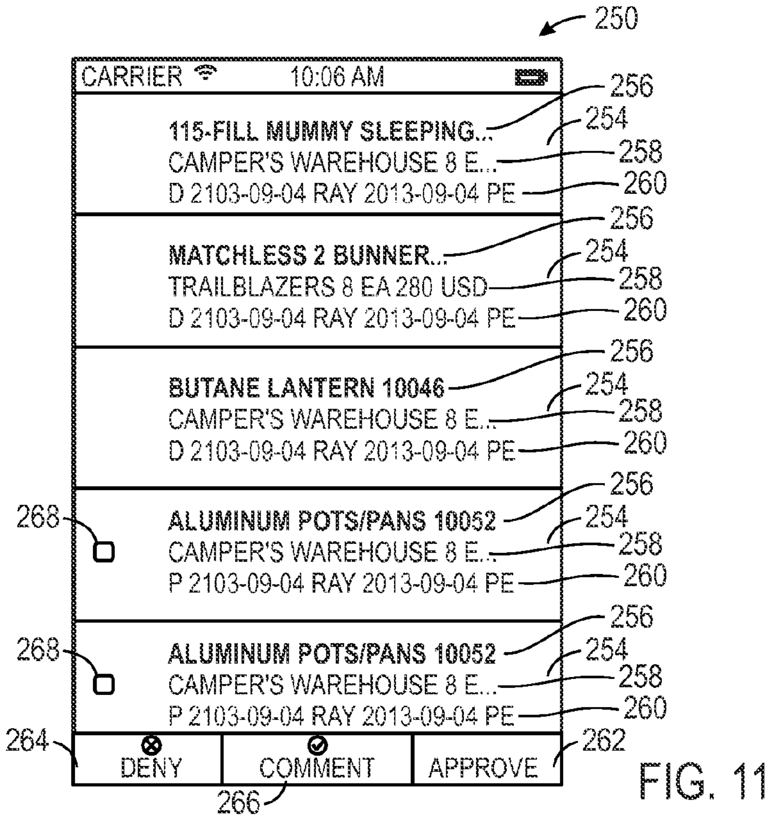
FIG. 11 illustrates another embodiment of a workflow screen for the mobile device of FIG. 1.

FIG. 11 depicts an embodiment of a screen 250 that may include a variant on position of certain control elements, in addition to customization of the data presented. The screen 250 may be provided as code stored in the memory 30 and executed by the processor 28. In the depicted example, the screen 250 includes a similar customization of data presentation as the screen 230 of FIG. 10. That is, the screen 250 includes line items 254 equivalent to line items 232 of the screen 230. Accordingly, textual items 256, 258, and 260 are equivalent to textual items 242, 244, and 246, respectively. However, the buttons 262 and 264, equivalent to the buttons 236 and 238 of the screen 230, have been positioned at the bottom of the screen and have been displayed in rectangular from rather than oblong form. Indeed, controls of various types may be similarly customized Additionally, checkboxes 268 (equivalent to checkboxes 234 of screen 230) are shown only on certain of the items 254. Indeed, conditions may be set during customization via the customization system 32 so that only certain items display checkboxes, further improving efficiency. Likewise, the comment button 266 is now provided in lieu of the back button 240, thus depicting how functionally in each screen may be modified.

Technical effects include a dynamic application useful for providing one or more graphical user interfaces customizable for multiple clients. Technical effects additionally include a license server suitable for validating user and client data, and for transmitting connectivity information once the aforementioned data is validated. Technical effects further include a customization system that provides customization of an application programming interface (API) data so that the API data may be incorporated into the dynamic application without recompilation and used to customize a GUI, a process, or a combination thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A non-transitory computer readable medium storing executable instructions which, when executed by a processor, cause the processor to:

communicatively couple a server having the processor to a remote mobile device;

receive a user login, a user password, and a client identification from the mobile device;

validate a client as a licensed client based on the user login, user password, and client identification;

derive a connectivity data based on the user login, user password, and client identification if the client is a valid licensed client, wherein the connectivity data comprises a first connectivity data configured to communicatively couple the mobile device to a first system different from the server by enabling the mobile device to communicate with the first system to validate a login into the first system, and a second connectivity data configured to communicatively couple the mobile device to a second system different from the server and the first system by enabling the mobile device to communicate with the second system to validate a login into the first system; wherein the mobile device is configured to download a first application programming interface (API) from the first system or from the second system on every login into the first system or into the second system, wherein the mobile device is configured to apply the first API to execute a graphical user interface (GUI) reconfiguration from a first GUI presented by a screen of the mobile device into a second GUI presented by the screen of the mobile device; and execute a customization system via the first system or the second system, wherein the customization system is configured to display a screen comprising a plurality of graphical controls to customize the first API.

2. The non-transitory computer readable medium of claim 1, wherein the customization system is configured to display the screen configured to enable a user to customize the first API, wherein a first control of the plurality of graphical controls enables or disables a process executable by the mobile device.

3. The non-transitory computer readable medium of claim 2, wherein a second control of the plurality of graphical controls enables or disables a field name and a user-editable column description of the field name configured to store a textual name displayed by the mobile device.

4. The non-transitory computer readable medium of claim 3, wherein the mobile device is configured to to display the textual name via the GUI.

5. The non-transitory computer readable medium of claim 2, wherein the customization system is configured to:

provide a list of control types;

select one or more of the control types based on the list;

provide a list of controls based on the control types selected;

select one or more of the controls; and set a property for each of the controls selected.

6. The non-transitory computer readable medium of claim 5, wherein the customization system is configured to:

provide a list of process templates;

select one or more of the process templates based on the list; and modify a sequence of process steps for each of the one or more process templates selected.

7. The non-transitory computer readable medium of claim 6, wherein the customization system is included in the first system.

8. The non-transitory computer readable medium of claim 1, wherein the first system is configured to execute a human capital management (HCM) process, a supplier relationship management (SRM) process, a supply chain management (SCM) process, a financial process, an accounting process, a project portfolio management process, a project analytics process, a program management process, a resource management process, a proposal management process, a project costing process, a project discovery process, a billing process, a contracts process, an expenses process, a grants process, or a combination thereof.

9. The non-transitory computer readable medium of claim 1, wherein the connectivity data comprises a second connectivity data configured to communicatively couple the mobile device to a second system; and wherein the mobile device is configured to download a second API from the second system.

10. The non-transitory computer readable medium of claim 1, comprising instructions, which when executed by the processor, cause the processor to execute a middleware server, wherein the middleware server comprises a customization system configured to display a screen configured to enable a user to customize the first API.

11. A system comprising:

a hardware processor configured to:

communicatively couple a server having the hardware processor to a remote mobile device;

receive a user login, a user password, and a client identification from the mobile device;

validate a client as a licensed client based on the user login, user password, and client identification;

derive a connectivity data based on the user login, user password, and client identification if the client is a valid licensed client, wherein the connectivity data comprises a first connectivity data configured to communicatively couple the mobile device to a first system different from the server by enabling the mobile device to communicate with the first system to validate a login into the first system, and a second connectivity data configured to communicatively couple the mobile device to a second system different from the server and the first system by enabling the mobile device to communicate with the second system to validate a login into the first system; wherein the mobile device is configured to download a first application programming interface (API) from the first system or from the second system on every login into the first system or into the second system, wherein the mobile device is configured to apply the first API to execute a graphical user interface (GUI) reconfiguration from a first GUI presented by a screen of the mobile device into a second GUI presented by the screen of the mobile device; and a second hardware processor configured to execute a customization system via the first system or the second system, wherein the customization system is configured to display a screen comprising a plurality of graphical controls to customize the first API.

12. The system of claim 11, wherein the customization system is configured to display the screen configured to enable a user to customize the first API, wherein a first control of the plurality of graphical controls enables or disables a process executed by the mobile device.

13. The system of claim 12, wherein the second hardware processor is included in the first system.

14. The system of claim 11, wherein the customization system is configured to:

provide a list of control types;

select one or more of the control types based on the list;

provide a list of controls based on the control types selected;

select one or more of the controls; and set a property for each of the controls selected.

15. The system of claim 14, wherein the customization system is configured to:

provide a list of process templates;

select one or more of the process templates based on the list; and modify a sequence of process steps for each of the one or more process templates selected.

16. The system of claim 11, wherein the second processor is configured to execute a middleware server, wherein the middleware server comprises the customization system configured to display the screen configured to enable a user to customize the first API.

17. A method comprising:

communicatively coupling a license server to a remote mobile device;

receiving, from the mobile device, a user login, a user password, and a client identification;

validating, via the license server, a client as a licensed client the based on the user login, user password, and client identification;

deriving, via the license server, a connectivity data based on the user login, user password, and client identification if the client is a valid licensed client, wherein the connectivity data comprises a first connectivity data configured to communicatively couple the mobile device to a first system different from the license server by enabling the mobile device to communicate with the first system to validate a login into the first system, and a second connectivity data configured to communicatively couple the mobile device to a second system different from the license server and the first system by enabling the mobile device to communicate with the second system to validate a login into the first system; and wherein the mobile device is configured to download a first application programming interface (API) from the first system or from the second system on every login into the first system or into the second system, wherein the mobile device is configured to apply the first API to execute a graphical user interface (GUI) reconfiguration from a first GUI presented by a screen of the mobile device into a second GUI presented by the screen of the mobile device; and executing, via a second hardware processor, a customization system via the first system or the second system, wherein the customization system is configured to display a screen comprising a plurality of graphical controls to customize the first API.

18. The method of claim 17, wherein the customization system is configured to:

provide a list of control types;

select one or more of the control types based on the list;

provide a list of controls based on the control types selected;

select one or more of the controls; and set a property for each of the controls selected.

19. The method of claim 18, wherein the customization system is configured to:

provide a list of process templates;

select one or more of the process templates based on the list; and modify a sequence of process steps for each of the one or more process templates selected.

20. The method of claim 17, wherein the first system is configured to execute a human capital management (HCM) process, a supplier relationship management (SRM) process, a supply chain management (SCM) process, a financial process, an accounting process, a project portfolio management process, a project analytics process, a program management process, a resource management process, a proposal management process, a project costing process, a project discovery process, a billing process, a contracts process, an expenses process, a grants process, or a combination thereof.

* * * * *